United States Patent
Huang et al.

(10) Patent No.: US 8,508,490 B2
(45) Date of Patent: Aug. 13, 2013

(54) METHOD OF DETECTING A TOUCH EVENT FOR A TOUCH PANEL AND RELATED DEVICE

(75) Inventors: He-Wei Huang, Hsinchu (TW);
Hui-Hung Chang, Keelung (TW);
Chih-Yuan Chang, Changhua County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 778 days.

(21) Appl. No.: 12/565,762

(22) Filed: Sep. 24, 2009

(65) Prior Publication Data

US 2010/0253639 A1   Oct. 7, 2010

(30) Foreign Application Priority Data

Apr. 3, 2009 (TW) .............................. 098111272 A

(51) Int. Cl.
*G06F 3/041* (2006.01)

(52) U.S. Cl.
USPC .......................................... 345/173; 345/174

(58) Field of Classification Search
None
See application file for complete search history.

(56) References Cited

U.S. PATENT DOCUMENTS

| | | | |
|---|---|---|---|
| 6,750,853 B2 | 6/2004 | Takahashi | |
| 2002/0171635 A1 | 11/2002 | Takahashi | |
| 2006/0278444 A1* | 12/2006 | Binstead | 178/18.06 |
| 2007/0242053 A1* | 10/2007 | Muranaka | 345/173 |
| 2009/0207154 A1* | 8/2009 | Chino | 345/175 |
| 2011/0080367 A1* | 4/2011 | Marchand et al. | 345/174 |

FOREIGN PATENT DOCUMENTS

| | | |
|---|---|---|
| JP | H04308916 A | 10/1992 |
| JP | H05289805 A | 11/1993 |
| JP | H07129308 A | 5/1995 |
| JP | 200611568 A | 1/2006 |
| JP | 200787393 A | 4/2007 |
| JP | 2008117371 A | 5/2008 |
| JP | 2008217781 A | 9/2008 |
| TW | I288345 | 10/2007 |
| TW | 200910167 | 3/2009 |

* cited by examiner

*Primary Examiner* — Lixi C Simpson

(74) *Attorney, Agent, or Firm* — Winston Hsu; Scott Margo

(57) ABSTRACT

A method of detecting a touch event for a touch panel which comprises a plurality of intersecting traces. The method includes outputting a charge control signal to a trace of the plurality of traces, and keeping other traces except for the trace floating and determining whether the touch event happens according to a voltage signal on the trace.

25 Claims, 7 Drawing Sheets

METHOD OF DETECTING A TOUCH EVENT FOR A TOUCH PANEL AND RELATED DEVICE

BACKGROUND OF THE INVENTION

1. Field of the Invention

The present invention relates to a method of detecting a touch event for a touch panel and related device, and more particularly, to a method for enhancing efficiency of detecting a touch event and related device.

2. Description of the Prior Art

Touch panels, which are usually combined with liquid crystal displays to form touch screens, are popular interfaces that allow people to control consumer electronics and equipment easily. Capacitive touch panels have higher sensitivity and are more durable than other types of touch panels, such as resistive touch panels, and have become a mainstream touch panel technology. Among capacitive touch panel technologies, projected capacitive touch panels have the most potential, because the projected capacitive touch panels can precisely detect the location of a touch event, and multi-touch functions can be implemented in the projected capacitive touch panels. A projected capacitive touch panel consists of intersecting Indium Tin Oxide (ITO) traces that act as row and column electrodes. A coupling node is formed at each intersection of a row trace and a column trace, and a capacitor is formed between the coupling node and a ground. When a user touches or approaches the coupling node, a body capacitance may be coupled to the capacitor at the coupling node. Therefore, a location of this touch event is determined by detecting which trace capacitance change occurs on.

Please refer to FIG. 1, which is a schematic diagram of a touch control device 10 according to the prior art. The touch control device 10 is used for controlling a projected capacitive touch panel 12 consisting of intersecting ITO traces. The touch control device 10 comprises an analog-to-digital (A/D) converter 10 and a microprocessor 102. The A/D converter 100 is coupled to the touch panel 12 and the microprocessor 102, and is utilized for scanning all traces in the touch panel 12 for determining at which trace the capacitance change occurs. In detail, the A/D converter 100 sequentially outputs a charge control signal, e.g. a square wave signal, to each trace for charging/discharging a capacitor on each trace, and converts a voltage signal on each trace, which shows a charging/discharging curve, into a digital signal outputted to the microprocessor 102. When capacitance change happens on a trace, a voltage signal on the trace changes compared to a previous voltage signal taken on the same trace before the capacitance changed, so that a corresponding digital signal is also different from a previous digital signal taken before the capacitance changed. The microprocessor 102 is utilized for turning the A/D converter 100 on and off, for controlling the A/D converter 100 to scan the touch panel 12, and for adjusting operation modes of the touch panel 12 according to the digital signal generated by the A/D converter 100, so that the touch panel 12 can be operated within acceptable current consumption parameters. Briefly, the touch control device 10 determines that a touch event happens according to capacitance change on a trace, and controls operation modes of the touch panel 12.

When the touch control device 10 is scanning a trace, if other traces which are not scanned are floating and are not at a fixed voltage level, a human body capacitor may be coupled to the scanned trace, and a location of this touch event may not be detected correctly when a user touches the touch panel 12. Therefore, traces which are not scanned are usually kept at a fixed voltage level, such as a ground voltage level. When a trace in the touch panel 12 is touched, a capacitance on the touched trace increases and is different from a previous capacitance on the same trace before it was touched. Note that different capacitances correspond to different charge/discharge characteristic curves, so that different digital signals are generated. Therefore, the microprocessor 10 determines the touch event happens according to the digital signal.

The touch control device 10 operates in a drive mode or a sleep mode. During the drive mode, the touch control device 10 sequentially scans each trace in the touch panel 12, i.e. the A/D converter 100 sequentially outputs the charge control signal to every trace, for detecting any touch event. When the touch panel 12 consists of 20 traces, for example, the touch control device 10 takes 20 cycles to complete scanning for the whole touch panel 12. When size of the touch panel 12 increases, the number of traces in the touch panel 12 increases accordingly, and the touch control device 10 has to take more time to complete scanning. During the sleep mode, the touch control device 10 stops scanning. For general use, the time that the touch panel 12 is in use is only a small part of the day; when the human body leaves the touch panel 12 for a predetermined time, the touch control device 10 decreases the period of scanning; in other words, the touch control device 10 operates in the drive mode and in the sleep mode in turns in order to reduce current consumption.

Please refer to FIG. 2, which is a timing diagram of the touch control device 10. When a human body continuously touches the touch panel 12, the touch control device 10 operates in the drive mode, and the touch panel 12 operates in a normal mode. In this situation, the total average current consumption of the touch control device 10 and the touch panel 12 is 5 mA or so. After the human body leaves the touch panel 12, the touch control device 10 still operates in the drive mode for 2 more seconds, to be ready for the human body to touch the touch panel 12 again soon. When the touch control device 10 does not detect any touch events within the 2-second period, the touch control device 10 engages a periodic scheme by which the drive mode and the sleep mode are operated in turns. As shown in FIG. 2, the touch control device 10 initially operates with a 32 ms sleep mode and an 8 ms drive mode in turns, with average current consumption of around 1 mA, whereas a data report rate decreases from 136 Hz to 20 Hz. After the periodic scheme cycles through the 32 ms sleep mode and the 8 ms drive mode for 10 seconds, the touch panel 12 enters a doze mode, in which the touch control device 10 further decreases use of the drive mode, changing the periodic scheme to cycle a 152 ms sleep mode and the 8 ms drive mode to further reduce current consumption. In this situation, the current consumption does not exceed 250 uA, and the data report rate decreases from 25 Hz to 6.25 Hz. After the periodic scheme cycles through the 152 ms sleep mode and the 8 ms drive mode for 60 seconds, the touch control device 10 enters the sleep mode and does not do any scanning; the touch panel 12 also enters the sleep mode. In this situation, the current consumption does not exceed 50 uA, and the data report rate decreases to its lowest rate of 0 Hz. Under the sleep mode, the user cannot wake up the touch control device 10 through touch; the touch control device 10 can only be woken up through an external interrupt signal.

From the above, the touch control device for controlling the projected capacitive touch panel has around 5 mA current consumption in the drive mode. For optimizing current consumption, the touch control device has to operate in the periodic scheme, in which the sleep mode and the drive mode are operated in turns. Note that, during operation in the periodic scheme, performance of the data report rate in the touch control device is diminished, such that the touch control device 10 cannot detect touch events sensitively. Further, as number of traces increases, the touch control device has to take more time to complete scanning for the whole touch panel.

SUMMARY OF THE INVENTION

It is therefore a primary objective of the claimed invention to provide a method of detecting a touch event for a touch panel and related device.

The present invention discloses a method of detecting a touch event for a touch panel comprising a plurality of intersecting traces. The method comprises outputting a charge control signal to a trace of the plurality of traces and keeping other traces except for the trace floating, and determining whether the touch event happens according to a voltage signal on the trace.

The present invention further discloses a touch control device comprising an analog-to-digital (A/D) converter, a microprocessor, and a wakeup circuit. The A/D converter is coupled to the a plurality of traces of a touch panel, for outputting a charge control signal to a trace of the plurality of traces, and converting a first voltage signal into a first value. The microprocessor coupled to the A/D converter. The wakeup circuit is coupled to the A/D converter and the microprocessor, for comparing the first value with a threshold for generating a comparison result, and for controlling on and off states of the microprocessor according to the comparison result, wherein the threshold is utilized for determining whether a touch event happens.

The present invention further discloses a method of controlling a touch panel comprising a plurality of intersecting traces for a touch control device. The method comprises determining whether a touch event does not happen for a predetermined time, and performing a sleep mode and a pre-wakeup mode in turns on determining that the touch event does not happen for the predetermined time, wherein in the pre-wakeup mode, the touch control device outputs a charge control signal to a trace of the plurality of traces and keeps other traces except for the trace floating.

The present invention further discloses a method of detecting a touch event for a touch panel comprising N intersecting traces. The method comprises outputting a charge control signal to M traces of the N traces and determining whether the touch event happens according to a voltage signal on the M traces, wherein N is greater than M and M is an integer no less than 1.

The present invention further discloses a method of detecting a touch event for a touch panel comprising N intersecting traces. The method comprises determining whether the touch event happens by scanning M traces of the N traces, and determining a location of the touch event after determining that the touch event happens, wherein N is greater than M and M is an integer no less than 1.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
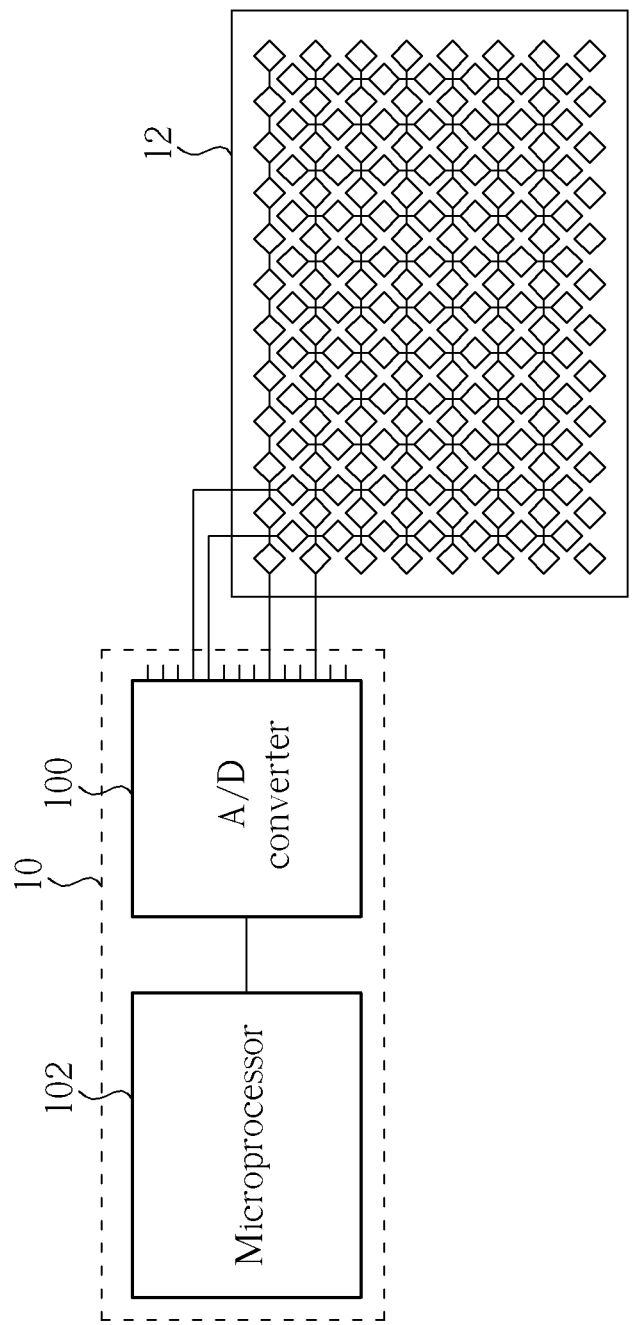
FIG. 1 is a schematic diagram of a touch control device according to the prior art.
Figure 2:
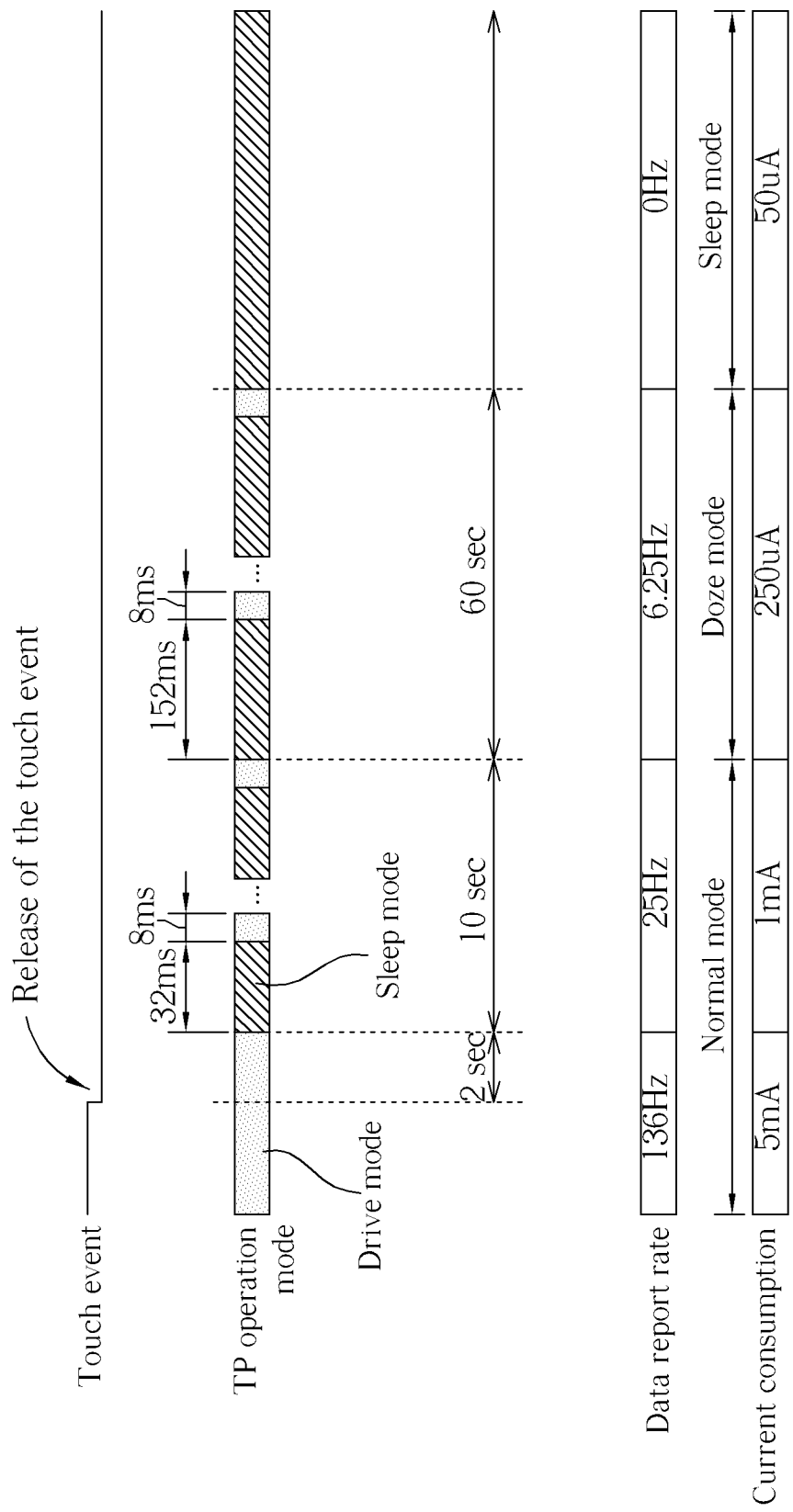
FIG. 2 is a timing diagram of the touch control device shown in FIG. 1.

In the prior art, regardless of whether a projected capacitive touch panel operates in a normal mode or a doze mode, a conventional touch control device always detects if a touch event happens through a drive mode, in which the touch control device sequentially scans all traces in the touch panel, as shown in FIG. 2. When the conventional touch control device is scanning a trace in the touch panel, if traces other than the scanned trace are kept floating, that is, voltage levels of the other traces are not fixed, a human body capacitor may be coupled to the scanned trace, causing location of the touch event to be determined incorrectly.

Figure 3:
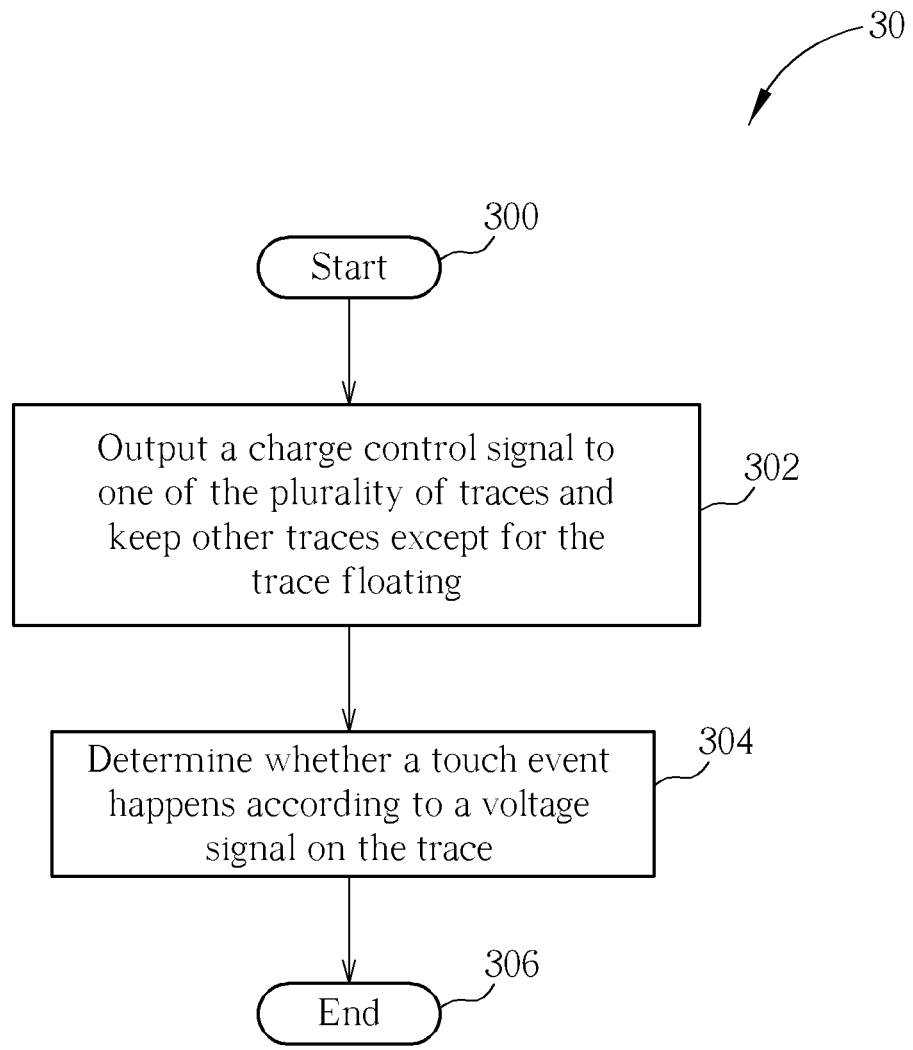
FIG. 3, FIG. 4, and FIG. 6 are flowcharts of processes according to embodiments of the present invention.

Please note that, the present invention uses the characteristic that the human body capacitor is coupled to the scanned trace when other traces are kept floating to improve detection of a touch event. Please refer FIG. 3, which is a flowchart of a process 30 according to an embodiment of the present invention. The process 30 is used for detecting a touch event happening on a touch panel, which is preferably a projected capacitive touch panel, comprising multiple intersecting traces as rows and columns. The process 30 includes the following steps:

Step 300: Start.

Step 302: Output a charge control signal to one of the plurality of traces and keep other traces except for the trace floating.

Step 304: Determine whether a touch event happens according to a voltage signal on the trace.

Step 306: End.

According to the process 30, to determine whether a touch event happens, the present invention includes scanning only one of all traces, called a trace L hereinafter, which means outputting a charge control signal, e.g. a square wave signal, to the trace L; at the same time, the present invention keeps other traces floating except for the trace L. In this situation, when any trace other than the scanned trace L is touched, a human body capacitor is coupled to the trace L which receives the charge control signal. Note that when the square-wave charge control signal is outputted to the trace L, a capacitor on the trace L is charged and discharged, so that a voltage signal on the trace L is not the same as the original charge control signal, and is varied according to a charge/discharge characteristic curve of the capacitor on the trace L. Therefore, whether or not the touch event happens can be determined by observing the voltage signal on the trace L.

As mentioned previously, outputting the charge control signal to the trace L is for charging/discharging the capacitor on the trace L. Before the touch event happens, the capacitor on the trace L has an initial capacitance, so that the voltage signal on the trace L in this situation is regarded as a predetermined signal corresponding to the initial capacitance. When the trace L is touched, the coupled human body capacitor increases the capacitance on the trace L and thus the capacitance on the trace L becomes larger than the initial capacitance existing before the trace was touched; the voltage signal on the trace L also changes correspondingly. According to the present invention, even if the touched trace is not the scanned trace L, the human body capacitance is still coupled to the trace L; the capacitance on the trace L also changes; the voltage signal on the trace L also changes. The present invention further compares the voltage signal on the trace L when the touch event happens with the predetermined signal which is the voltage signal on the trace L when the touch event does not yet happen. When a difference between the voltage signal on the trace L and the predetermined signal is greater than a reference value, the touch control device determines that the touch event happens. Otherwise, when the difference between the voltage signal on the trace L and the predetermined signal is smaller than the reference value, the touch control device determines that the touch event does not happen. The comparison between the voltage signal and the predetermined signal is performed for confirming that the meaningful touch event indeed happens and neglecting useless touches.

Briefly, the present invention outputs the charge control signal to only one trace to observe the voltage signal on the trace receiving the charge control signal, and to compare the voltage signal with the predetermined signal so as to determine that the touch event happens when the difference between the voltage signal on the trace and the predetermined signal is greater than the reference value. Wherever the touch event happens on the touch panel, the present invention can detect the touch event through the characteristic that the human body capacitor is coupled to the scanned trace when other traces are kept floating, and does not require scanning all traces. Operation of the process 30 is defined as a pre-wakeup mode using in the touch panel.

The process 30 is an embodiment, in which all other traces except for the scanned trace are floating; in fact, the present invention does not have to keep all other traces floating. In another embodiment of the present invention, the touch control device outputs the charge control signal and keeps apart of the other traces (instead of all of the other traces) floating when in the pre-wakeup mode, and also determines whether the touch event happens according to the voltage signal on the scanned trace.

In the prior art, the conventional touch control device sequentially scans all traces in the touch panel when in the drive mode to directly determine the location of the touch event; the conventional touch control device does not determine whether the touch event happens separately (independently). Furthermore, for the condition illustrated in FIG. 2 wherein the touch event is not detected for 2 seconds, even though the conventional touch control device changes to operate the drive mode and the sleep mode in turns in a periodic scheme, the operation of determining the location of the touch event is still performed in the drive mode during the periodic scheme. That is, the conventional touch control device does not change the operation mode when the touch event happens. Compared to the prior art, the pre-wakeup mode according to the present invention is operated to determine whether the touch event happens, not to determine the location of the touch event. Once the touch event happens, the present invention then controls the touch control device to enter the drive mode and start to determine the location of the touch event. In a word, in the present invention, determining whether the touch event happens and determining the location of the touch event are performed in different operation modes.

Figure 4:
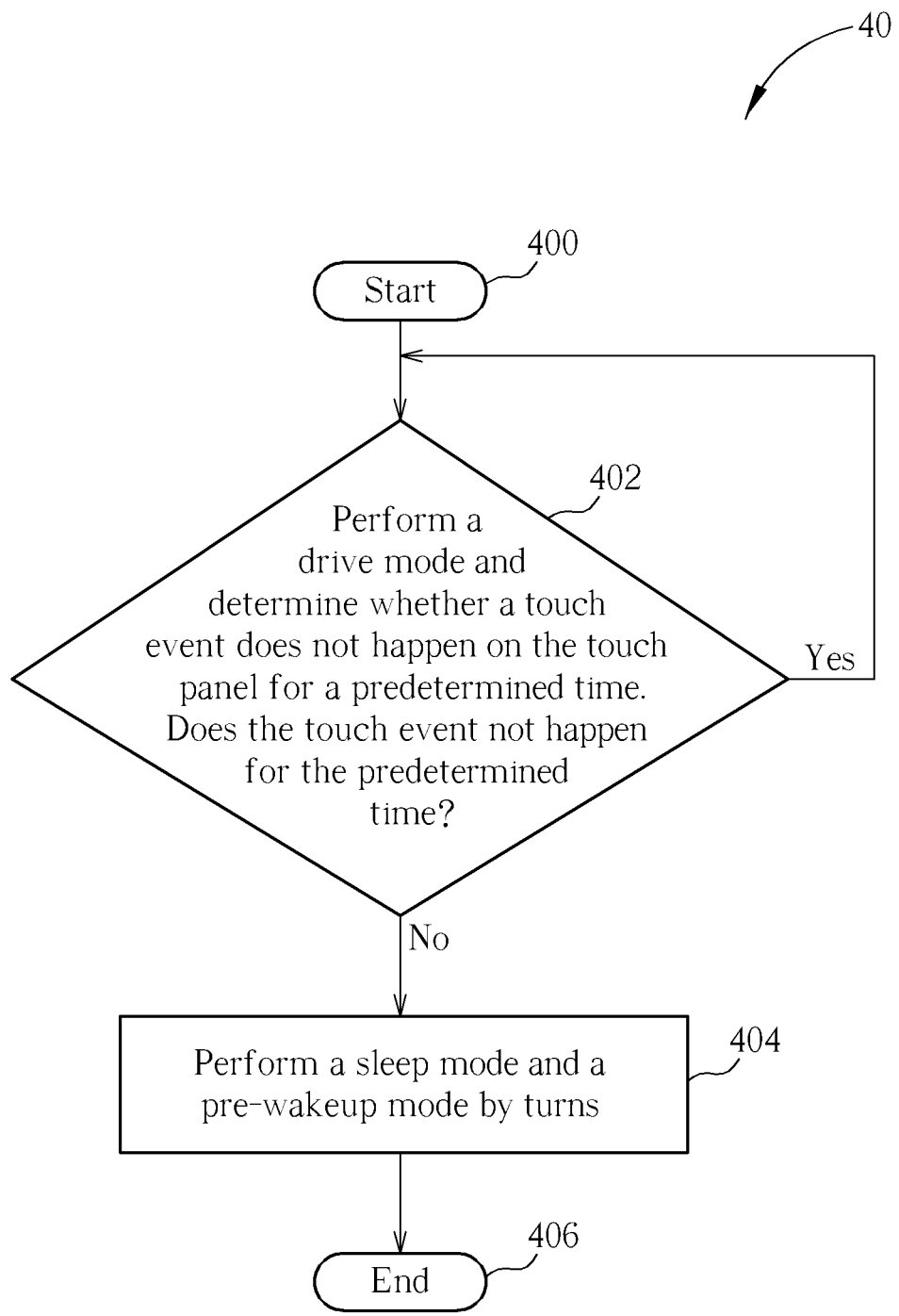

Please refer to FIG. 4, which is a flowchart of a process 40 according to an embodiment of the present invention. The process 40 is utilized in a touch control device for controlling a projected capacitive touch panel comprising multiple intersecting traces, for reducing current consumption. The process 40 includes the following steps:

Step 400: Start.

Step 402: Perform a drive mode and determine whether a touch event does not happen on the touch panel for a predetermined time; if the touch event does not happen, perform Step 404; otherwise, continue performing the drive mode.

Step 404: Perform a sleep mode and a pre-wakeup mode by turns.

Step 406: End.

Note that, in the pre-wakeup mode, the touch control device outputs a charge control signal to a trace, keeps other traces except for the scanned trace floating, and determines whether the touch event happens according to the voltage signal on the trace. According to the process 40, the present invention is to determine whether a touch event does not happen on the touch panel for a predetermined time. When a touch event does not happen for the predetermined time, the touch control device enters the periodic scheme of the sleep mode and the pre-wakeup mode according to the process 30 by turns. Otherwise, the touch event may continuously happen, and therefore the touch control device keeps performing the drive mode. Because the touch control device does not require scanning all traces in the pre-wakeup mode, the time for detecting the touch event is shortened during the periodic scheme in which the sleep mode and the pre-wakeup mode are performed in turns.

Figure 5:
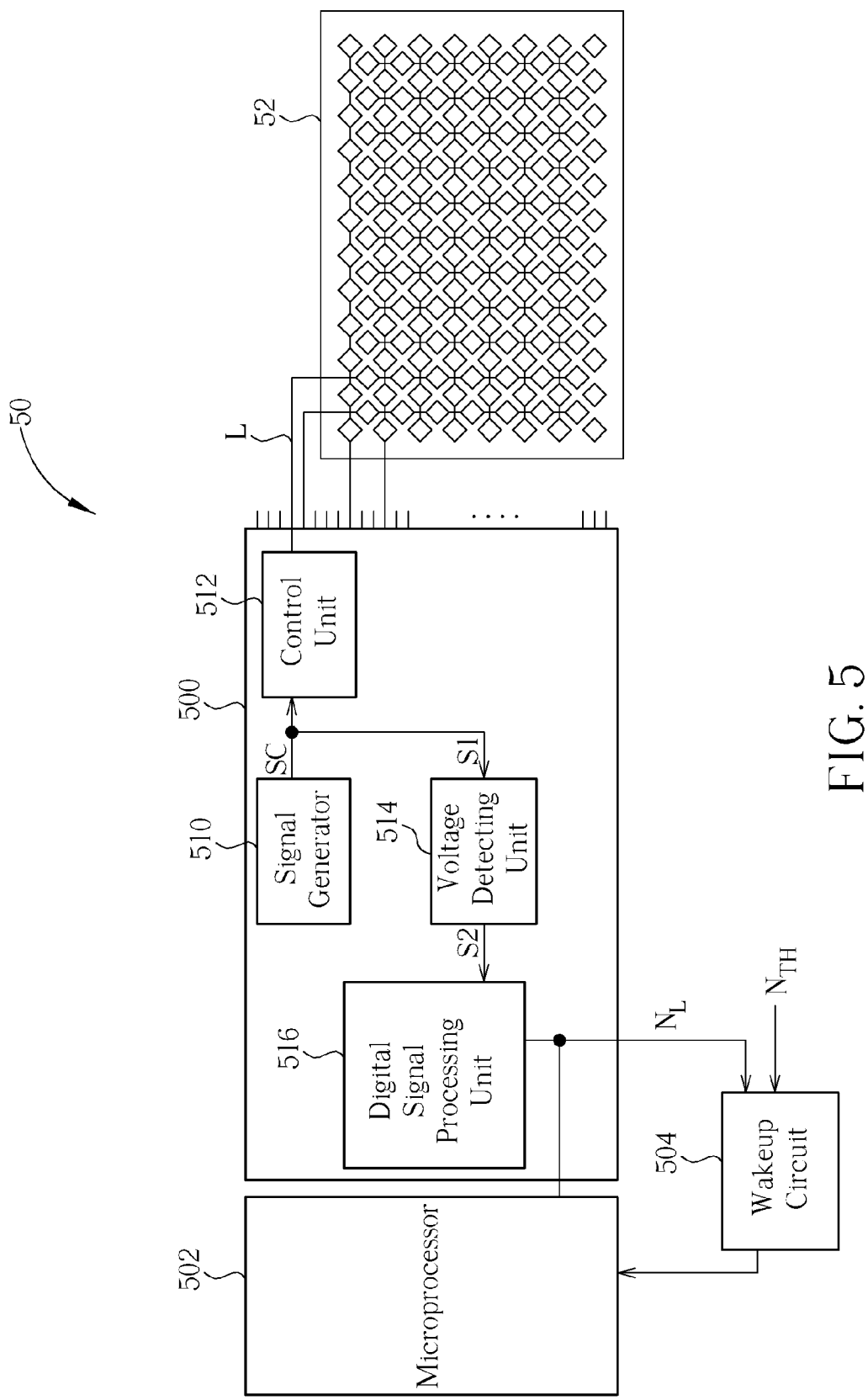
FIG. 5 is a schematic diagram of a touch control device according to an embodiment of the present invention.

Please refer to FIG. 5, which is a schematic diagram of a touch control device 50 according to an embodiment of the present invention. The touch control device 50 is a hardware implementation for the process 30 and the process 40. The touch control device 50 is coupled to a touch panel 52, which is a projected capacitive touch panel comprising multiple intersecting traces. The touch control device 50 can operate in the drive mode, the sleep mode, and the pre-wakeup mode. The touch control device 50 comprises an A/D converter 500, a microprocessor 502 and a wakeup circuit 504. The A/D converter 500 is coupled to the touch panel 52, microprocessor 502, and the wakeup circuit 504. The A/D converter 500 comprises a signal generator 510, a control unit 512, a voltage detecting unit 514 and a digital signal processing unit 516. In brief, operations of the A/D converter 500 include outputting a charge control signal SC to the touch panel 52 and converting the voltage signal S1 on the trace L which receives the charge control signal SC into a corresponding value $N_L$. The operations of the A/D converter 500 are described in detail as follows.

The signal generator 510 is utilized for outputting the charge control signal SC. The control unit 512 is coupled to the signal generator 510 and all traces in the touch panel 52, and is utilized for controlling a signal connection between the signal generator 510 and each trace. The control unit 512 comprises multiple multi-state switches, wherein each switch selectively couples the trace to the signal generator 510, to a fixed voltage, or to a floating terminal.

In the drive mode, the control unit 512 connects the signal generator 510 and the scanned trace L, and also connects other traces and a fixed voltage, such as a ground voltage. Through the control unit 512, the signal generator 510 can sequentially output the charge control signal SC to all traces. In the pre-wakeup mode, the control unit 512 only connects the signal generator 510 and a trace in the touch panel 52, and also connects other traces and the floating terminal; in this situation, the signal generator 510 only outputs the charge control signal SC to a trace. In other words, the touch control device 50 only scans a trace. Influenced by the charge/discharge effect, the voltage signal S1 on the scanned trace L is not similar to the charge control signal.

The voltage detecting unit 514 is coupled to the signal generator 510 and the control unit 512, and is utilized for detecting the voltage signal S1 on the trace L and outputting a voltage signal S2 according to the voltage signal S1. Note that the control unit 512 connects the signal generator 510 and the trace L when the trace L is scanned, so that the voltage detecting unit 514 detects the voltage signal S1 on the trace L. The voltage detecting unit 514 can be a general voltage detector; the voltage signal S1 is an input voltage of the voltage detector. When the voltage signal S1 is greater than a threshold voltage, the voltage detecting unit 514 outputs a fixed voltage; when the voltage signal S1 is less than the threshold voltage, the voltage detecting unit 514 does not output voltage. Therefore, the analog voltage signal S1 is converted into the digital voltage signal S2 through the voltage detecting unit 514. The digital signal processing unit 516 is coupled to the voltage detecting unit 514, the microprocessor 502 and the wakeup circuit 504, and is utilized for converting the voltage signal S2 into a value $N_L$, and outputting the value $N_L$ to the microprocessor 502 and the wakeup circuit 504. From the above, the value $N_L$ reflects the capacitance on the trace L. Let a value $N_{L0}$ denote a value converted from the voltage signal S1 when the touch event does not yet happen, corresponding to the initial capacitance on the trace L. When the touch event happens, the voltage signal S1 changes due to the increase of the capacitance on the trace L; the value $N_L$ changes accordingly, and is different from the vale $N_{L0}$.

The microprocessor 502 is coupled to the digital signal processing unit 516, and is utilized for determining whether a touch event does not happen on the touch panel for a predetermined time according to the value $N_L$, for controlling operation modes of the touch control device 50. When the microprocessor 502 determines that the touch event happens, the microprocessor 502 controls the touch control device 50 to operate in the drive mode, sequentially scanning all traces. When the microprocessor 502 determines that the touch event does not happen for the predetermined time, such as 2 seconds, according to the value $N_L$, the microprocessor 502 then controls the touch control device 50 to enter the periodic scheme in which the sleep mode and the pre-wakeup mode are performed in turns. In the pre-wakeup mode, the microprocessor 502 stops operating, and the detection of the touch event and the switching of the operation modes are executed by the A/D converter 500 and the wakeup circuit 504.

From the above, whether the touch event happens is determined when in the pre-wakeup mode, whereas the location of the touch event is determined when in the drive mode. The wakeup circuit 504 is utilized for determining whether the touch event happens when the touch control device 50 operates in the pre-wakeup mode. The wakeup circuit 504 is coupled to the digital signal processing unit 516 and the microprocessor 502, and can be implemented as a comparator. The wakeup circuit 504 is utilized for comparing the value $N_L$ with a value $N_{TH}$ for generating a comparison result and for controlling on and off states of the microprocessor 504 according to the comparison result. The value $N_{TH}$ is a threshold for determining whether the touch event happens, which is greater than the value $N_{L0}$ corresponding to the voltage signal S1 when the touch event has not happened yet. Note that the value $N_{TH}$ corresponds to the predetermined signal introduced in the process 30, which is compared with the voltage signal on the scanned trace. In addition, a difference $N_D$ between the value $N_{TH}$ and the value $N_{L0}$ corresponds to a variation of capacitance on the trace L indicating that the touch event indeed happens, where $N_{TH}=N_{L0}+N_D$. When $N_L \geq N_{TH}$, the touch event happens. In this situation the wakeup circuit 504 turns on the microprocessor 502, so that the touch control device 50 returns to operate in the drive mode. When $N_L<N_{TH}$, that is, the touch event has not happened yet. At this time, the wakeup circuit 504 does not turn on the microprocessor 504, and the touch control device 50 continues operating in the sleep mode and the pre-wakeup mode in turns. The microprocessor 504 being turned on indicates that the touch control device 50 is operating in the drive mode, whereas the microprocessor 504 being turned off indicates that the touch control device 50 is operating in the sleep mode and in the pre-wakeup mode in turns. In other words, the operation mode of the touch control device 50 is decided by whether the microprocessor 504 is turned on or off.

The wakeup circuit 504 is one embodiment of the present invention, and those skilled in the art can make alterations and modifications accordingly. According to the relationship between the value $N_L$ and $N_{L0}$, it is derived that when $(N_L-N_{L0}) \geq N_D$, the touch event happens; when $(N_L-N_{L0})<N_D$, the touch event has not happened yet. Therefore, in another embodiment, the wakeup circuit can also comprise a subtractor and a comparator; the subtractor performs subtraction on the value $N_L$ and the value $N_{L0}$; and the comparator compares the generated result $(N_L-N_{L0})$ with the value $N_D$ so as to generate a control signal for waking up the microprocessor when the touch event happens. The values $N_{TH}$, $N_{L0}$ and $N_D$ are stored in a memory (which is omitted in FIG. 5) of the touch control device 50, and can be adjusted according to the environmental condition, such as the temperature, in order to realize more precise touch event detection.

Figure 6:
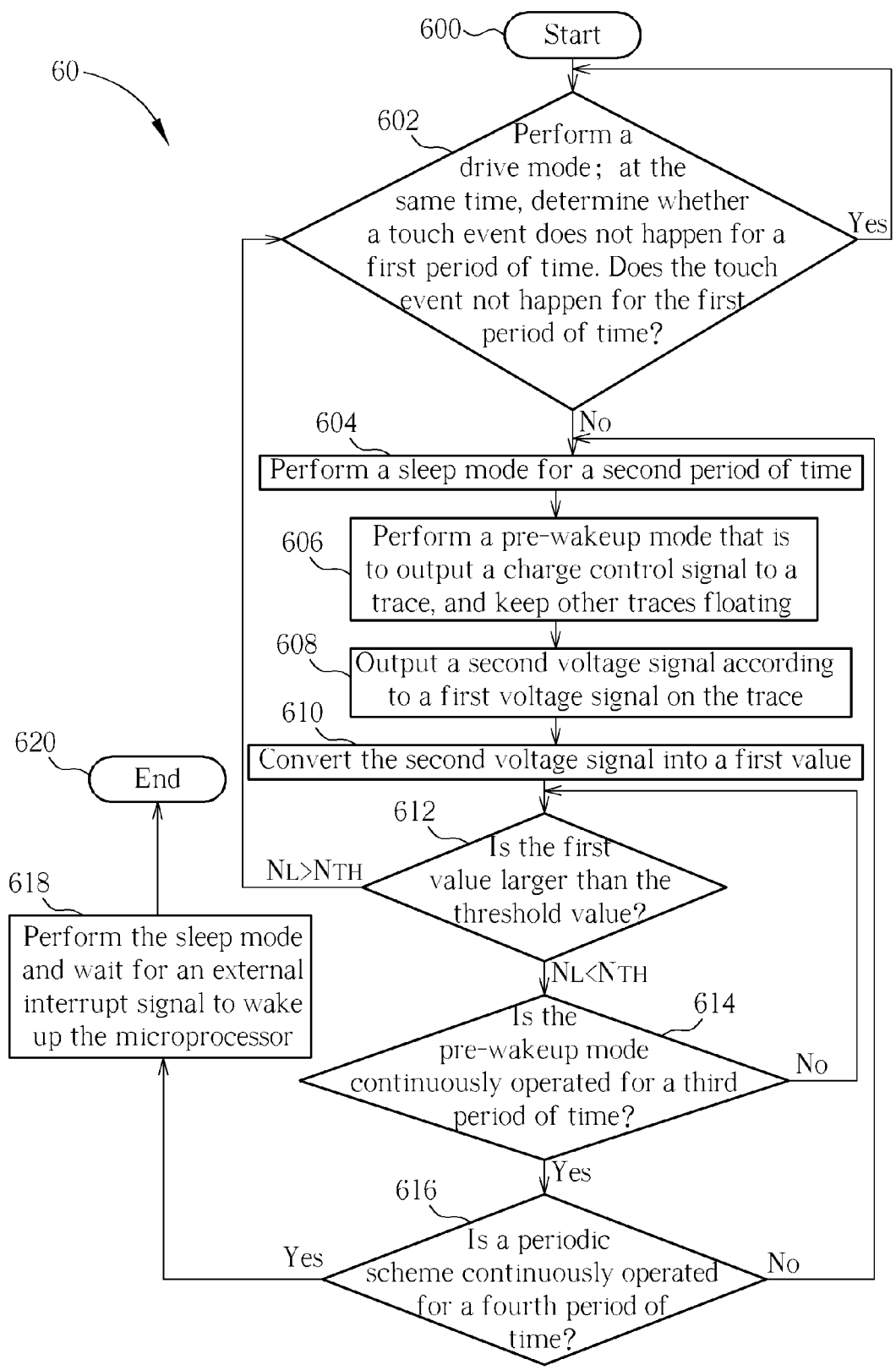

From the above, the touch control device 50 operates in the pre-wakeup mode through the A/D converter 500 and the wakeup circuit 504, and operates in the drive mode through the A/D converter 500 and the microprocessor 502. Please refer to FIG. 6, which is a flowchart of a process 60 according to an embodiment of the present invention. The process 60 is used for controlling operations of the touch control device 50. The process 60 includes the following steps:

Step 600: Start.

Step 602: Perform a drive mode; at the same time, the microprocessor 502 determines whether a touch event does not happen for a first period of time; if the touch event does not happen, perform Step 604.

Step 604: Perform a sleep mode for a second period of time.

Step 606: Perform a pre-wakeup mode; the signal generator 510 outputs a charge control signal to a trace, and keeps traces other than the trace floating.

Step 608: The voltage detecting unit 514 outputs a second voltage signal according to a first voltage signal on the trace.

Step 610: The digital signal processing unit 516 converts the second voltage signal into a first value.

Step 612: The wakeup circuit 504 compares the first value with a threshold value. If the first value is greater than the threshold value, return to Step 602; otherwise, perform Step 614.

Step 614: Determine whether the pre-wakeup mode is continuously operated for a third period of time; if yes, perform Step 616; otherwise, return to Step 612.

Step 616: Determine whether a periodic scheme in which the sleep mode and the pre-wakeup mode are performed in turns is continuously operated for a fourth period of time; if yes, perform Step 618; otherwise, return to Step 604.

Step 618: Perform the sleep mode and wait for an external interrupt signal to wake up the microprocessor 502.

Step 620: End.

Step 602 to Step 612 are operations of the touch control device 50, and description thereof is not repeated herein.

When the sleep mode and the pre-wakeup mode are performed in turns, a time of the sleep mode (which is the second period of time in the process 60) and a time of the pre-wakeup mode (which is the third period of time in the process 60) is adjustable. That is, the periodic scheme in which the sleep mode and the pre-wakeup mode are performed in turns has different patterns. Step 614 and Step 616 are not implemented in the touch control device 50; Step 614 is utilized for determining whether the touch control device 50 has to transfer from the pre-wakeup mode to the sleep mode during the periodic scheme; Step 616 is utilized for determining whether the touch control device 50 has to enter the sleep mode. Note that determining whether or not to enter the sleep mode according to a total time of the periodic scheme (Step 616) is one embodiment of the present invention; in another embodiment, the timing to enter the sleep mode can be determined according to how long the touch event has been released for, or according to a time of parts of the periodic scheme. In addition, when the microprocessor 502 does not detect the touch event for the predetermined time and starts to operate the periodic scheme, the microprocessor 502 can first enter the pre-wakeup mode and the transfer to the sleep mode after the pre-wakeup mode is operated for a while. Any method using the periodic scheme of the pre-wakeup mode and the sleep mode in turns is included in the embodiments of the present invention.

Figure 7:
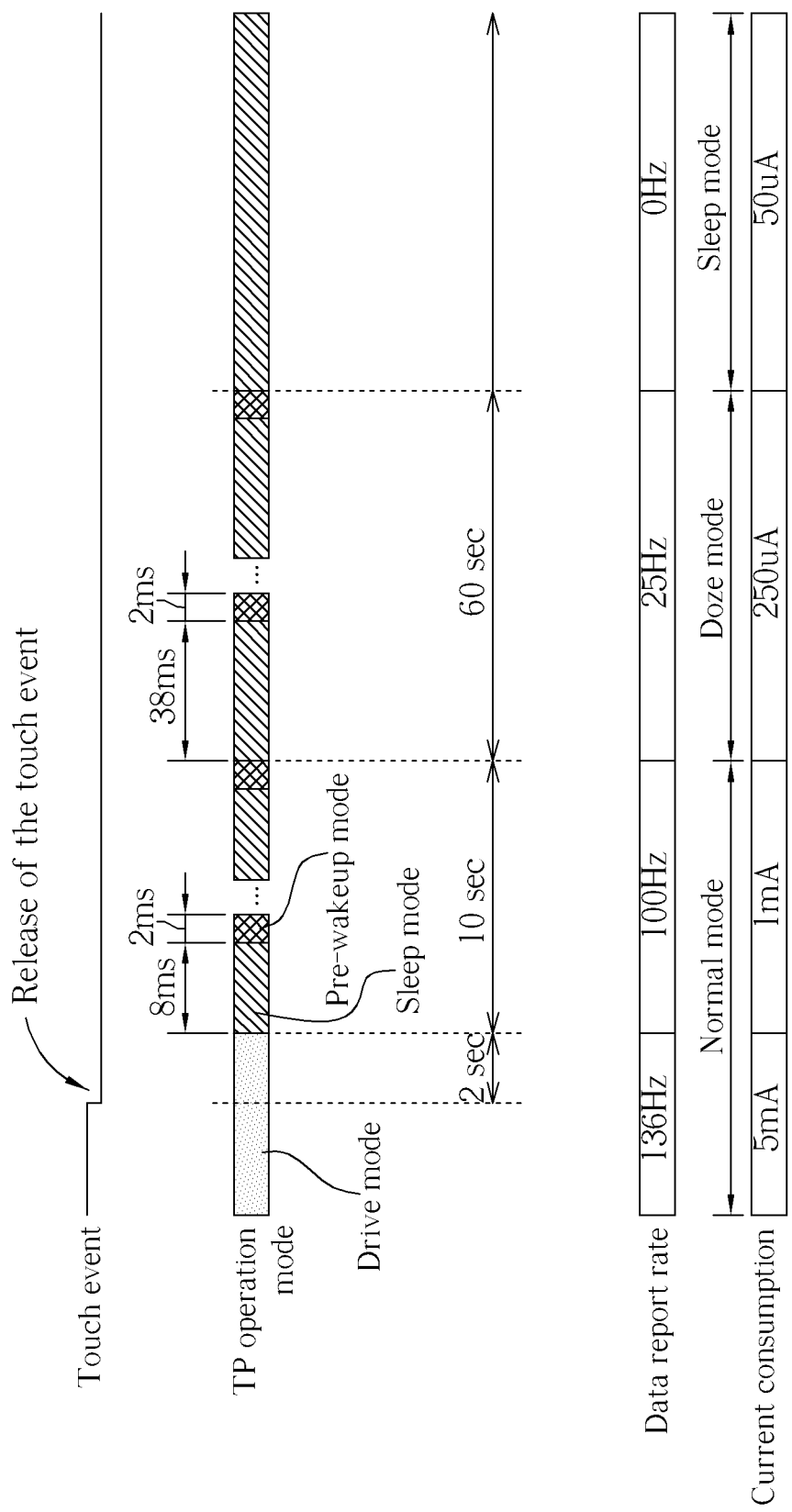
FIG. 7 is a timing diagram of the touch control device when using the process shown in FIG. 6.

Please refer to FIG. 7, which is a timing diagram of the touch control device 50 when using the process 60. As shown in FIG. 7, when the touch event occurs continuously, the touch control device 50 operates in the drive mode, in which total current consumption is around 5 mA. When the touch event releases, the touch control device 50 still operates in the drive mode for 2 seconds (which is the first period of time in the process 60).

From the timing of the touch event already releases for 2 seconds, in the coming 10 seconds, if the user wants to maintain the current consumption around 1 mA during the same time as shown in FIG. 2, the touch control device 50 shall operate in a first periodic scheme in which the 8 ms sleep mode and the 2 ms pre-wakeup mode are operated in turns. In this situation, the data report rate is around 100 Hz, which is much higher than the data report rate 25 Hz during the same time as shown in FIG. 2. Furthermore, when the first periodic scheme is operated for 10 seconds and no touch event is detected, the use of the pre-wakeup mode in the periodic scheme decreases for reducing current consumption. If the user wants to maintain the current consumption around 250 uA during the same time as shown in FIG. 2, a second periodic scheme in which the 38 ms sleep mode and the 2 ms pre-wakeup mode are operated in turns is required, and in this situation, the data report rate is 25 Hz, higher than the data report rate 6.25 Hz shown in FIG. 2. When the second periodic scheme is operated for 60 seconds, the touch control device 50 enters the entire sleep mode in which current consumption is under 50 uA and the data report rate decreases to 0 Hz. As shown in FIG. 7, the fourth period of time in the process 60 can be regarded as the period of the second periodic scheme or as a sum of periods of the first and the second periodic schemes that is equal to 70 seconds, or a time since the release of the touch event that is 72 seconds. From the above, based on the same current consumption, the data report rate in the periodic scheme is greatly enhanced through the pre-wakeup mode according to the present invention.

Note that the timing diagram of FIG. 7 is one embodiment of the present invention, wherein the data report rate is estimated based on the fixed current consumption as in FIG. 2. In another embodiment, the use of the sleep mode and the pre-wakeup mode in the periodic scheme is designed according to an expected current consumption or an expected data report rate. For example, when the same data report rate as in FIG. 2 is maintained instead, the use of the pre-wakeup mode in the periodic scheme can be reduced, and current consumption can be reduced accordingly. In addition, when the expected data report rate is increased, the use of the pre-wakeup mode in the periodic scheme should be increased accordingly, whereas current consumption is also increased. An appropriate proportion of the use of the sleep mode and the use of the pre-wakeup mode can improve the data report rate and the current consumption both.

In conclusion, the present invention uses the idea that a human body capacitor may be coupled to the scanned trace when traces other than the scanned trace are kept floating to provide the pre-wakeup mode, and therefore, the touch control device only requires scanning one trace instead of scanning all traces to detect the touch event, so that the current consumption is reduced. Furthermore, for the touch control device using the pre-wakeup mode and having the wakeup circuit, the microprocessor in the touch control device does not operate in the pre-wakeup mode, and when the touch event is detected, the microprocessor is turned on by the wakeup circuit in order to operate in the drive mode again. Therefore, current consumption of the touch control device is efficiently reduced.

Those skilled in the art will readily observe that numerous modifications and alterations of the device and method may be made while retaining the teachings of the invention.

What is claimed is:

1. A method of detecting a touch event for a touch panel comprising a plurality of intersecting traces, the method comprising:
   only outputting a charge control signal to a single trace of the plurality of traces and keeping other traces except for the trace floating; and
   determining whether the touch event happens according to a voltage signal on the trace.

2. The method of claim 1, wherein the step of determining whether the touch event happens according to the voltage signal on the trace comprises:
   comparing the voltage signal with a predetermined signal; and
   determining that the touch event happens when a difference between the voltage signal and the predetermined signal is greater than a reference value.

3. The method of claim 2, wherein the step of determining whether the touch event happens according to the voltage signal on the trace further comprises:
   determining that the touch event does not happen when the difference between the voltage signal and the predetermined signal is less than the reference value.

4. The method of claim 1, wherein the touch panel is a projected capacitive touch panel.

5. A touch control device comprising:
   an analog-to-digital (A/D) converter coupled to the plurality of traces of a touch panel for outputting a charge control signal to a trace of the plurality of traces, and converting a first voltage signal into a first value;
   a microprocessor coupled to the A/D converter; and
   a wakeup circuit coupled to the A/D converter and the microprocessor, for comparing the first value with a threshold for generating a comparison result, and for controlling on and off states of the microprocessor according to the comparison result, wherein the threshold is utilized for determining whether a touch event happens.

6. The touch control device of claim 5, wherein the A/D converter comprises:
a signal generator for generating a charge control signal;
a control unit coupled to the signal generator and the plurality of traces for controlling a corresponding signal connection between each of the plurality of traces and the signal generator;
a voltage detecting unit coupled to the signal generator and the control unit, for outputting a second voltage signal according to the first voltage signal; and
a digital signal processing unit coupled to the voltage detecting unit, the microprocessor and the wakeup circuit, for converting the second voltage signal into the first value.

7. The touch control device of claim 6, wherein when the microprocessor does not detect the touch event for a predetermined time after release of the touch event, the control unit connects the signal generator and the trace, and keeps other traces except for the trace floating.

8. The touch control device of claim 6, wherein when the microprocessor continuously detects the touch event, the control unit connects the signal generator and the trace, and keeps other traces except for the trace at a fixed voltage level.

9. The touch control device of claim 5, wherein the wakeup circuit turns on the microprocessor when the comparison result indicates that the first value is greater than or equal to the threshold.

10. The touch control device of claim 5, wherein the wakeup circuit does not turn on the microprocessor when the comparison result indicates that the first value is less than the threshold.

11. The touch control device of claim 5, wherein the microprocessor determines whether the touch event does not happen for a predetermined time since release of the touch event according to the first value for controlling operation modes of the touch control device.

12. The touch control device of claim 5, wherein the touch panel is a projected capacitive touch panel.

13. A method of controlling a touch panel comprising a plurality of intersecting traces for a touch control device, the method comprising:
determining whether a touch event does not happen for a predetermined time; and
performing a sleep mode and a pre-wakeup mode in turns on determining that the touch event does not happen for the predetermined time, wherein in the pre-wakeup mode, the touch control device only outputs a charge control signal to a single trace of the plurality of traces and keeps other traces except for the trace floating.

14. The method of claim 13 further comprising:
when determining that the touch event happens before passage/expiration of the predetermined time, sequentially outputting the charge control signal to the plurality of traces and keeping other traces not receiving the charge control signal at a fixed voltage level.

15. The method of claim 13 further comprising:
controlling operation modes of the touch control device according to a first voltage signal on the trace.

16. The method of claim 15, wherein the step of controlling the operation modes of the touch control device according to the first voltage signal comprises:
comparing a first value corresponding to the first voltage signal and a threshold for generating a comparison result; and
controlling the operation modes of the touch control device according to the comparison result.

17. The method of claim 16, wherein the threshold is utilized for determining whether the touch event happens.

18. The method of claim 16, wherein the step of controlling the operation modes of the touch control device according to the comparison result comprises:
changing an operation mode of the touch control device when the comparison result indicates that the first value is greater than or equal to the threshold.

19. The method of claim 16, wherein the step of controlling the operation modes of the touch control device according to the comparison result comprises:
maintaining the operation mode of the touch control device when the comparison result indicates that the first value is less than the threshold.

20. The method of claim 13, wherein the touch panel is a projected capacitive touch panel.

21. A method of detecting a touch event for a touch panel comprising N intersecting traces, the method comprising:
only outputting a charge control signal to a single traces of the N traces and keeping other traces except for the single trace of the N traces floating; and
determining whether the touch event happens according to a voltage signal on the single traces.

22. The method of claim 21, wherein the step of determining whether the touch event happens according to the voltage signal comprises:
comparing a voltage signal on the single trace with a predetermined signal; and
determining that the touch event happens when a difference between voltage signal and the predetermined signal is greater than a reference value.

23. The method of claim 21, wherein the touch panel is a projected capacitive touch panel.

24. A method of detecting a touch event for a touch panel comprising N intersecting traces, the method comprising:
only outputting a charge control signal to a single trace of the N traces;
determining whether the touch event happens by scanning the single traces of the N traces and keeping other traces except for the single traces of the N traces floating; and
determining a location of the touch event after determining that the touch event happens.

25. The method of claim 24, wherein the step of determining whether the touch event happens comprises:
determining whether the touch event happens according to a voltage signal on the single trace.

* * * * *